US012424726B2

(12) United States Patent
Zhao et al.

(10) Patent No.: US 12,424,726 B2
(45) Date of Patent: Sep. 23, 2025

(54) ANTENNA ASSEMBLY AND VEHICLE

(71) Applicant: FUYAO GLASS INDUSTRY GROUP CO., LTD., Fujian (CN)

(72) Inventors: Weibing Zhao, Fujian (CN); Yinghao Peng, Fujian (CN); Xiya Feng, Fujian (CN); Ziwei Fang, Fujian (CN)

(73) Assignee: FUYAO GLASS INDUSTRY GROUP CO., LTD., Fujian (CN)

( * ) Notice: Subject to any disclaimer, the term of this patent is extended or adjusted under 35 U.S.C. 154(b) by 163 days.

(21) Appl. No.: 18/231,558

(22) Filed: Aug. 8, 2023

(65) Prior Publication Data

US 2023/0387566 A1 Nov. 30, 2023

Related U.S. Application Data

(63) Continuation of application No. PCT/CN2022/075368, filed on Feb. 7, 2022.

(30) Foreign Application Priority Data

Feb. 9, 2021 (CN) ........................ 202110174893.1

(51) Int. Cl.
*H01Q 1/12* (2006.01)
*H01Q 1/38* (2006.01)

(52) U.S. Cl.
CPC ............. *H01Q 1/1271* (2013.01); *H01Q 1/38* (2013.01)

(58) Field of Classification Search
CPC ........ H01Q 1/1271; H01Q 1/38; H01Q 21/28; H01Q 1/325; H01Q 9/0457; H01Q 21/065;

(Continued)

(56) References Cited

U.S. PATENT DOCUMENTS 10,490,877 B2 * 11/2019 Talty ...................... H01Q 9/045
10,737,469 B2 * 8/2020 Droste ................ H01Q 9/0407

(Continued)

FOREIGN PATENT DOCUMENTS

CN 105529524 A 4/2016
CN 109494457 A 3/2019

(Continued)

OTHER PUBLICATIONS

International Search Report dated Mar. 28, 2022 issued in PCT/CN2022/075368.

(Continued)

*Primary Examiner* — Seung H Lee
(74) *Attorney, Agent, or Firm* — Scully, Scott, Murphy & Presser, P.C.

(57) ABSTRACT

An antenna assembly and a vehicle are provided. The antenna assembly includes a first carrier plate, a first circuit board, a second carrier plate, and a second circuit board. The first circuit board is disposed between the first carrier plate and the second carrier plate, and the second carrier plate is disposed between the first circuit board and second circuit board. The first circuit board includes at least one antenna element, the second circuit board includes at least one coupler, the second circuit board is configured to receive an excitation signal, the excitation signal is coupled to the at least one antenna element by the at least one coupler, and the at least one antenna element is configured to generate an antenna signal according to the excitation signal and radiate the antenna signal.

18 Claims, 7 Drawing Sheets

(58) Field of Classification Search
CPC ............ H01Q 21/24; H01Q 1/40; H01Q 1/22; H01Q 1/50; H01Q 21/0006
See application file for complete search history.

(56) References Cited

U.S. PATENT DOCUMENTS

| | | | |
|---|---|---|---|
| 11,052,640 | B2 * | 7/2021 | Schmalbuch .............. B60J 1/02 |
| 11,569,580 | B2 * | 1/2023 | Dai ........................ H01Q 1/325 |
| 2005/0195114 | A1 | 9/2005 | Yegin et al. |
| 2006/0202898 | A1 | 9/2006 | Li et al. |
| 2019/0089065 | A1 | 3/2019 | Sikes et al. |
| 2020/0343626 | A1 | 10/2020 | Rieder |

FOREIGN PATENT DOCUMENTS

| | | | |
|---|---|---|---|
| CN | 111370862 | A | 7/2020 |
| CN | 211088492 | U | 7/2020 |
| EP | 2565985 | A1 | 3/2013 |

OTHER PUBLICATIONS

Chinese First Office Action dated Oct. 9, 2021 issued in CN 202110174893.1.

Chinese Second Office Action dated Mar. 23, 2022 issued in CN 202110174893.1.

Decision of Rejection dated Jul. 29, 2022 issued in CN application No. 202110174893.1.

Extended European search report dated Jul. 15, 2024 received in European Patent Application No. 22752214.1.

Notice of Reasons for Refusal dated Aug. 29, 2024 received in Japanese Patent Application No. 2023-547837.

* cited by examiner

ANTENNA ASSEMBLY AND VEHICLE

CROSS-REFERENCE TO RELATED APPLICATION(S)

This application is a continuation of International Application No. PCT/CN2022/075368, filed Feb. 7, 2022, which claims priority to Chinese Patent Application No. 202110174893.1, filed Feb. 9, 2021, the entire disclosures of which are hereby incorporated by reference.

TECHNICAL FIELD

This disclosure relates to the field of communication technology, and in particular to an antenna assembly and a vehicle.

BACKGROUND

With the development of new technologies such as internet of vehicles and automated driving, vehicles are evolving toward intelligent terminals, more and more antennas are integrated on the vehicles, and the vehicles are no longer merely transportation means.

Currently, antenna signals are received or transmitted by disposing a "shark fin" antenna on the top or side of a vehicle. Such an antenna arrangement method cannot avoid an influence caused by shielding of a vehicle body, a space of the "shark fin" antenna is small, mutual coupling of various antennas leads to problems of signal interference such as crosstalk, and the antenna is also exposed outside the vehicle body and is vulnerable to damage.

SUMMARY

In a first aspect, an antenna assembly is provided in the present disclosure. The antenna assembly includes a first carrier plate, at least one first circuit board, a second carrier plate, and a second circuit board. The first circuit board is disposed on one side of the first carrier plate. The second carrier plate is disposed on one side of the first circuit board away from the first carrier plate. The second circuit board is disposed on one side of the second carrier plate away from the first circuit board. The first circuit board includes at least one antenna element. The second circuit board includes at least one coupler. The second circuit board is configured to receive or transmit an excitation signal, the excitation signal is coupled to the at least one antenna element by the at least one coupler, and the at least one antenna element is configured to generate an antenna signal according to the excitation signal and radiate the antenna signal.

In a second aspect, a vehicle is further provided in the present disclosure. The vehicle includes glass and an antenna assembly. The antenna assembly is disposed at the glass. The antenna assembly includes a first carrier plate, at least one first circuit board, a second carrier plate, and a second circuit board. The first circuit board is disposed on one side of the first carrier plate. The second carrier plate is disposed on one side of the first circuit board away from the first carrier plate. The second circuit board is disposed on one side of the second carrier plate away from the first circuit board. The first circuit board includes at least one antenna element. The second circuit board includes at least one coupler. The second circuit board is configured to receive or transmit an excitation signal, the excitation signal is coupled to the at least one antenna element by the at least one coupler, and the at least one antenna element is configured to generate an antenna signal according to the excitation signal and radiate the antenna signal.

BRIEF DESCRIPTION OF THE DRAWINGS

To describe the technical solutions in implementations of the present disclosure more clearly, the accompanying drawings for use in implementations are briefly described. Apparently, the accompanying drawings in the following description show merely some implementations of the present disclosure, and those of ordinary skill in the art may obtain other drawings from these accompanying drawings without creative efforts.

DETAILED DESCRIPTION

Figure 1:
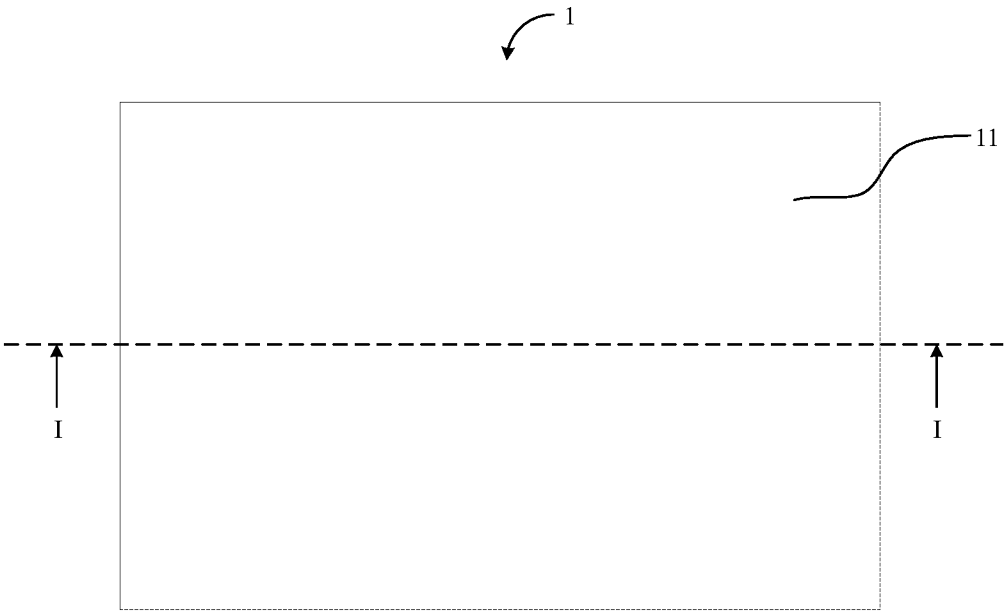
FIG. 1 is a schematic top view of an antenna assembly according to an embodiment of the present disclosure.

The technical solutions in implementations of the present disclosure will be clearly and completely described below with reference to the accompanying drawings of implementations of the present disclosure. Apparently, implementations described are merely some rather than all of implementations of the present disclosure. All other implementations obtained by those of ordinary skill in the art based on implementations of the present disclosure without creative efforts shall fall within the scope of protection of the present disclosure.

The present disclosure discloses an antenna assembly, which can solve the technical problems of antenna signals being shielded by a vehicle body, signal interference and antennas being vulnerable to damage.

In a first aspect, an antenna assembly is provided in the present disclosure. The antenna assembly includes a first carrier plate, at least one first circuit board, a second carrier plate, and a second circuit board. The first circuit board is disposed on one side of the first carrier plate. The second carrier plate is disposed on one side of the first circuit board away from the first carrier plate. The second circuit board is disposed on one side of the second carrier plate away from the first circuit board. The first circuit board includes at least one antenna element. The second circuit board includes at least one coupler. The second circuit board is configured to receive or transmit an excitation signal, the excitation signal is coupled to the at least one antenna element by the at least one coupler, and the at least one antenna element is configured to generate an antenna signal according to the excitation signal and radiate the antenna signal.

In an implementation, the first circuit board further includes a first substrate and at least one first conductive layer disposed on one side of the first substrate, and the at least one antenna element is disposed on one first conductive layer in the at least one first conductive layer close to the second circuit board. The second circuit board further includes a second substrate and at least one second conductive layer disposed on one side of the second substrate. When the at least one second conductive layer is implemented as two second conductive layers, the two second conductive layers comprise a first conductive sub-layer and a second conductive sub-layer, the first conductive sub-layer and the second conductive sub-layer are respectively disposed on two sides of the second substrate, the first conductive sub-layer is disposed close to the second carrier plate, the at least one coupler is disposed on the first conductive sub-layer, and the first conductive sub-layer serves as reference ground of the at least one antenna element.

In an implementation, the antenna assembly further includes a first bonding layer and a second bonding layer. The first bonding layer is disposed between the first carrier plate and the first circuit board and configured to bond the first carrier plate and the first circuit board; and/or the second bonding layer is disposed between the second carrier plate and the second circuit board and configured to bond the second carrier plate and the second circuit board.

In an implementation, the at least one antenna element is disposed corresponding to the at least one coupler, and an orthographic projection of the at least one antenna element on the second circuit board covers the at least one coupler.

In an implementation, when the at least one antenna element is implemented as two or more antenna elements, orthographic projections of the two or more antenna elements on the second carrier plate are distributed on two opposite sides of the second carrier plate.

In an implementation, the two or more antenna elements include a first antenna and a second antenna, and an extension line of an orientation of the first antenna is perpendicular to or parallel to an extension line of an orientation of the second antenna.

In an implementation, the first circuit board is further provided with a signal separator and a delay transmission module. The signal separator is electrically connected to the two or more antenna elements and configured to distribute the excitation signal coupled by the at least one coupler to the two or more antenna elements. The delay transmission module is configured to delay a phase of the excitation signal coupled by the at least one coupler and transmit the excitation signal delayed to the two or more antenna elements.

In an implementation, the delay transmission module is electrically connected to the second antenna, and the delay transmission module is configured to delay the phase of the excitation signal by 90 degrees.

In an implementation, the two ore more antenna elements, the signal separator, and the delay transmission module are disposed on the at least one first conductive layer, and the first substrate is configured to carry the first conductive layer.

In an implementation, the second circuit board is further provided with a signal receiving port, a signal separator, and a delay transmission module. The signal receiving port is configured to receive an excitation signal externally input. The signal separator is electrically connected to the at least one antenna element and configured to distribute the excitation signal received to the at least one antenna element. The delay transmission module is configured to delay a phase of the excitation signal received and transmit the excitation signal delayed to the at least one antenna element.

In an implementation, the at least one coupler, the signal separator, the delay transmission module, and the signal receiving port are disposed on the second conductive layer. The second substrate is configured to carry the second conductive layer.

In an implementation, the signal separator, the delay transmission module, and the signal receiving port are disposed on the second conductive sub-layer.

In an implementation, the second circuit board further includes a protective film, and the protective film is arranged between the first conductive sub-layer and the second carrier plate, and on one side of the second conductive sub-layer away from the second substrate.

In an implementation, a thickness of the first substrate in a stacked direction ranges from 25 μm to 125 μm; a thickness of the second substrate in the stacked direction from 25 μm to 125 μm; a thickness of the first conductive layer in the stacked direction from 10 μm to 100 μm; and a thickness of the second conductive layer in the stacked direction ranges from 10 μm to The first carrier plate and the second carrier plate are respectively configured to carry the first circuit board and the second circuit board, such that a communication component can be disposed in the glass, multiple mounting manners are provided for the antenna assembly, thereby solving problems such as a narrow antenna space, insufficient isolation of various antennas, and antenna signals being shielded. In addition, the first carrier plate and the second carrier plate play a role of protecting the at least one antenna element.

In a second aspect, a vehicle is further provided in the present disclosure. The vehicle includes glass and an antenna assembly. The antenna assembly is disposed at the glass. The antenna assembly includes a first carrier plate, at least one first circuit board, a second carrier plate, and a second circuit board. The first circuit board is disposed on one side of the first carrier plate. The second carrier plate is disposed on one side of the first circuit board away from the first carrier plate. The second circuit board is disposed on one side of the second carrier plate away from the first circuit board. The first circuit board includes at least one antenna element. The second circuit board includes at least one coupler. The second circuit board is configured to receive or transmit an excitation signal, the excitation signal is coupled to the at least one antenna element by the at least one coupler, and the at least one antenna element is configured to generate an antenna signal according to the excitation signal and radiate the antenna signal.

Figure 2:
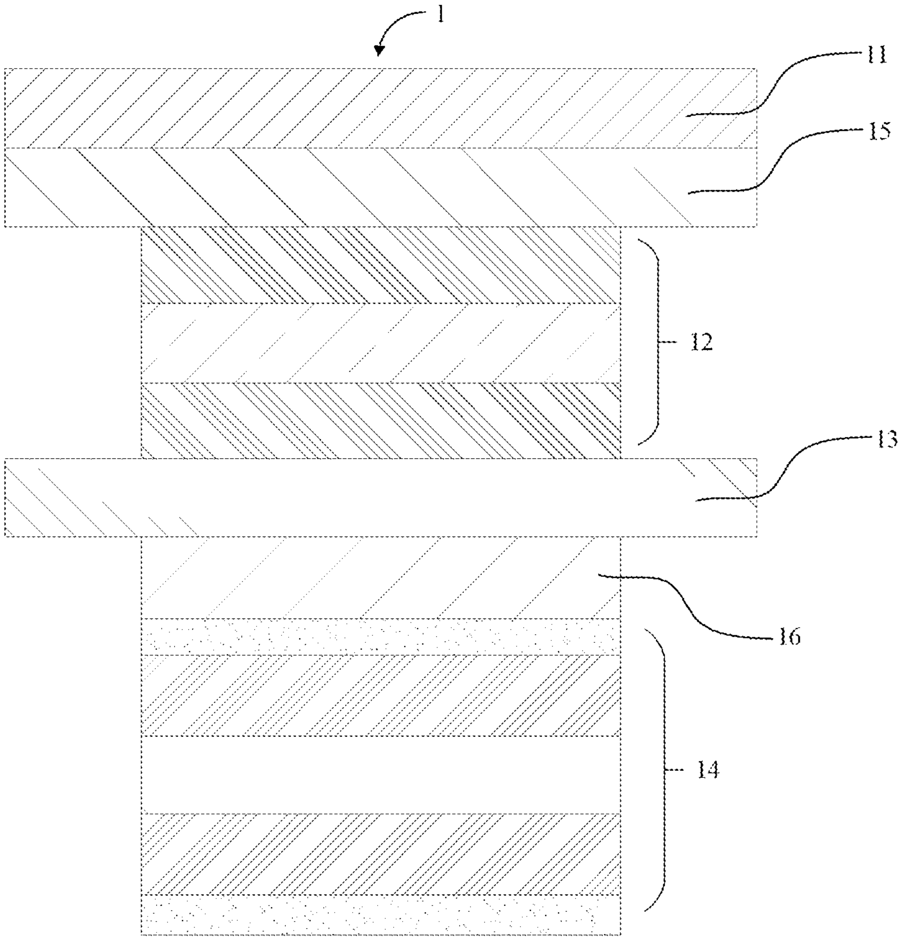
FIG. 2 is a schematic cross-sectional view along line I-I in FIG. 1.
Figure 3:
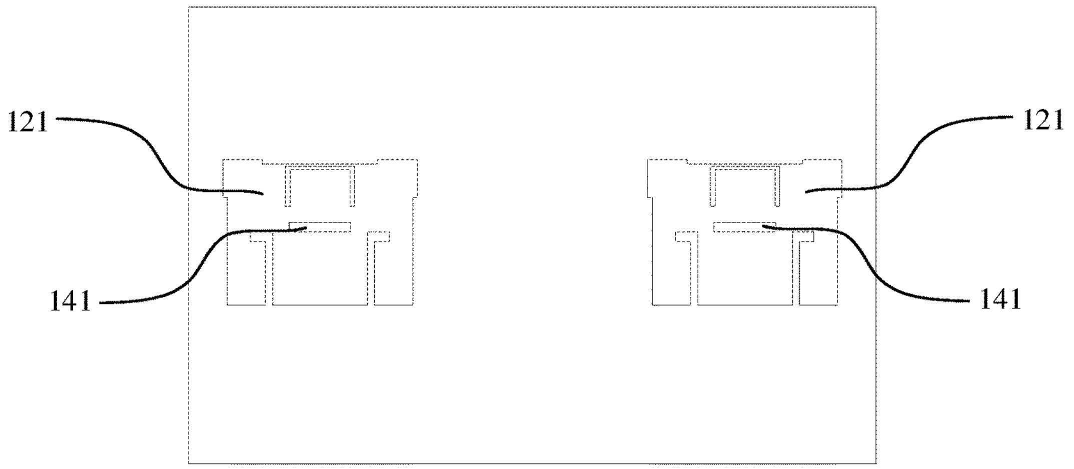
FIG. 3 is a schematic perspective view of antenna elements and couplers according to an embodiment of the present disclosure.

An antenna assembly 1 is provided in the present disclosure. With reference to FIG. 1 to FIG. 3 together, FIG. 1 is a schematic top view of an antenna assembly according to an embodiment of the present disclosure; FIG. 2 is a schematic cross-sectional view along line I-I in FIG. 1; and FIG. 3 is a schematic perspective view of antenna elements and couplers according to an embodiment of the present disclosure. The antenna assembly 1 includes a first carrier plate 11, at least one first circuit board 12, a second carrier plate 13, and a second circuit board 14. The first circuit board 12 is disposed on one side of the first carrier plate 11; the second carrier plate 13 is disposed on one side of the first circuit board 12 away from the first carrier plate 11; and the second circuit board 14 is disposed on one side of the second carrier plate 13 away from the first circuit board 12. The first circuit board 12 includes at least one antenna element 121, the second circuit board 14 includes at least one coupler 141, the second circuit board 14 is configured to receive or transmit an excitation signal, the excitation signal is coupled to the antenna element 121 by the at least one coupler 141, and the antenna element 121 is configured to generate an antenna signal according to the excitation signal and radiate the antenna signal.

Specifically, the antenna element 121 may be, but is not limited to, a metal sheet. The antenna signal radiated by the antenna element 121 may be generated by an object carrying the antenna assembly 1, for example, a mobile tool such as a vehicle, or may be generated by an external electronic device, for example, a communication tool such as a mobile phone. When the number of the antenna elements 121 is greater than or equal to two, the antenna elements 121 may be distributed in an array such that the radiated antenna signals have a wider range and better signal quality.

Specifically, in this embodiment, the coupler 141 is a coupling slot, and the excitation signal received by the second circuit board 14 is coupled to the antenna element 121 through the coupling slot, such that the antenna element 121 radiates the antenna signal. The coupling slot may be in an "H" shape, a linear shape, a "U" shape, an "L" shape, etc., which is not limited in the present disclosure.

Specifically, the antenna assembly 1 further includes a first bonding layer 15 and/or a second bonding layer 16. The first bonding layer 15 is disposed between the first carrier plate 11 and the first circuit board 12 and configured to bond the first carrier plate 11 and the first circuit board 12. The second bonding layer 16 is disposed between the second carrier plate 13 and the second circuit board 14 and configured to bond the second carrier plate 13 and the second circuit board 14. In this embodiment, the first bonding layer 15 is made of polyvinyl butyral (PVB), and the second bonding layer 16 is made of a 3M adhesive. The first bonding layer 15 and the second bonding layer 16 each are relatively thin, and do not have a great influence on the thickness of the antenna assembly under the condition of ensuring an adhesion effect. When the second bonding layer 16 is made of the 3M adhesive, since the second circuit board 14 is disposed on the side of the second carrier plate 13 away from the first carrier plate 11, that is to say, the second bonding layer 16 may be exposed to an environment. In this way, the second bonding layer 16 preferably needs to meet the requirements of weathering resistance of various environments, for example, the second bonding layer 16 is less likely to fall off under the influence of high and low temperatures, salt mist, etc., so that the second bonding layer 16 can better bond the second carrier plate 13 and the second circuit board 14. It can be understood that in other possible embodiments, the first bonding layer 15 and the second bonding layer 16 may also be made of other materials, which is not limited in the present disclosure.

In other possible embodiments, the antenna assembly 1 provided in the present disclosure may also not include the second circuit board 14, that is to say, the antenna assembly 1 only radiates wireless signals of objects directly electrically connected to the antenna assembly 1, instead of receiving externally input wireless signals, which is not limited in the present disclosure.

It should be noted that in a possible embodiment, the antenna assembly 1 may be a glass plate mounted with a communication component, and the glass plate mounted on an object usually has outer side glass and inner side glass. Preferably, in this embodiment, since the second circuit board 14 is disposed on the side of the second carrier plate 13 away from the first circuit board 12, the first carrier plate 11 serves as the outer side glass of the antenna assembly 1, and the second carrier plate 13 serves as the inner side glass of the antenna assembly 1, such that the first carrier plate 11 plays a role of protecting the first circuit board 12 and the second circuit board 14.

It can be understood that in this embodiment, the first carrier plate 11 and the second carrier plate 13 are respectively configured to carry the first circuit board 12 and the second circuit board 14, such that the communication component can be disposed in the glass, and multiple mounting manners are provided for the antenna assembly 1, thereby solving problems such as a narrow antenna space, insufficient isolation of various antennas, and antenna signals being shielded. In addition, the first carrier plate 11 and the second carrier plate 13 play a role of protecting the antenna element 121.

In a possible embodiment, with reference to FIG. 3 again, the antenna element 121 is disposed corresponding to the coupler 141, and an orthographic projection of the antenna element 121 on the second circuit board 14 covers the coupler 141.

Specifically, in this embodiment, the antenna elements 121 and the couplers 141 are identical in number and are disposed in a one-to-one correspondence, such that the couplers 141 couple excitation signals to different antenna elements 121. In this embodiment, the coupler 141 is a coupling slot. Because the coupling slot couples the excitation signal to the antenna element 121 by means of a waveguide effect, when the orthographic projection of the antenna element 121 on the second circuit board 14 covers the coupler 141, the excitation signal coupled by the coupling slot can be coupled to the antenna element 121 at the maximum efficiency.

In a possible embodiment, when the number of the antenna elements 121 is greater than or equal to two, the orthographic projections of the antenna elements 121 on the second carrier plate 13 are distributed on two opposite sides of the second carrier plate 13.

Orthographic projections of the antenna elements 121 on the second carrier plate 13 are distributed on the two opposite sides of the second carrier plate 13, that is to say, the antenna elements 121 are closer to an outer side edge of the second carrier plate 13 than the center of the second carrier plate 13. Generally, when the antenna assembly 1 is mounted on other objects, there may also be other electronic devices capable of radiating antenna signals in the environment.

It can be understood that if the antenna elements 121 are relatively close to each other, it is possible to cause the problem of signal interference such as mutual coupling crosstalk between antennas. Also, in the present disclosure, the orthographic projections of the antenna elements 121 on the second carrier plate 13 are distributed on the two opposite sides of the second carrier plate 13, so that the isolation of various antenna elements 121 is increased, and the problem of signal interference is solved.

Figure 4:
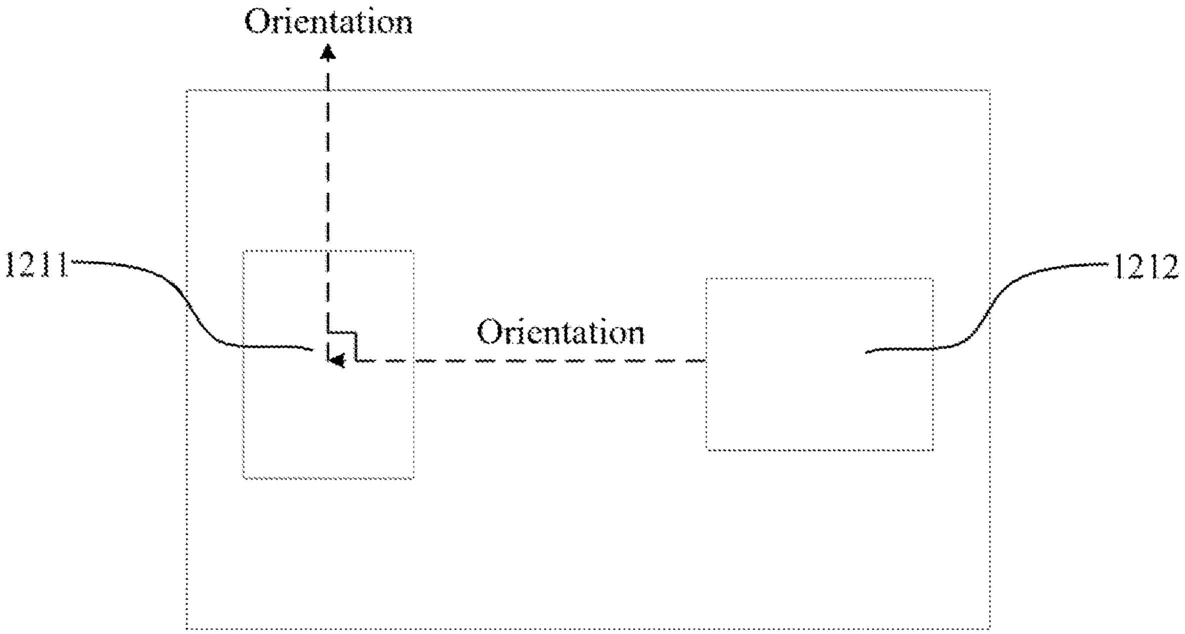
FIG. 4 is a schematic diagram of distribution of an antenna element according to an embodiment of the present disclosure.
Figure 5:
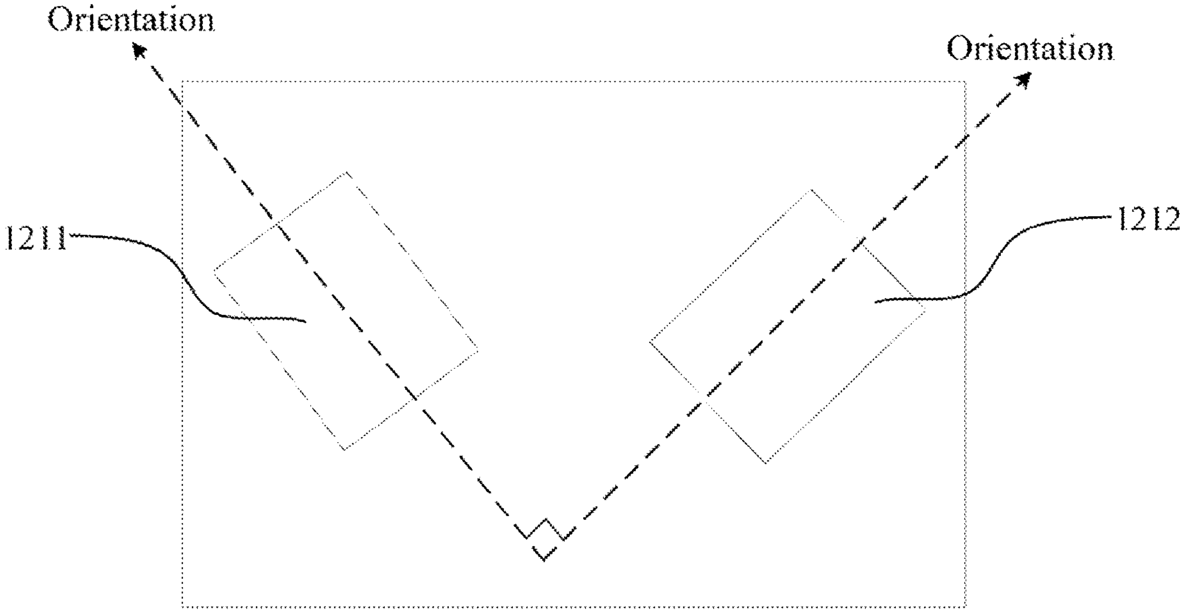
FIG. 5 is a schematic diagram of distribution of an antenna element according to another embodiment of the present disclosure.

In a possible embodiment, referring to FIG. 4 and FIG. 5 together, FIG. 4 is a schematic diagram of distribution of the antenna element according to an embodiment of the present disclosure; and FIG. 5 is a schematic diagram of distribution of the antenna element according to another embodiment of the present disclosure. The antenna element 121 includes a first antenna 1211 and a second antenna 1212, and an extension line of an orientation of the first antenna 1211 is perpendicular to or parallel to an extension line of an orientation of the second antenna 1212.

Specifically, the so-called orientation refers to a direction in which the antenna element 121 radiates an antenna signal. The extension line of the orientation of the first antenna 1211 is perpendicular to or parallel to the extension line of the orientation of the second antenna 1212, such that the first antenna 1211 and the second antenna 1212 can implement a dual-polarization mode. The so-called dual-polarization mode means that in a coordinate system established by the first antenna 1211 and the second antenna 1212, the radiation of horizontal antenna signals and the radiation of vertical antenna signals can be implemented, that is, two antenna signals can be radiated simultaneously.

It can be understood that, in other possible embodiments, an angle defined by the extension line of the orientation of the first antenna 1211 and the extension line of the orientation of the second antenna 1212 may also be various, which is not limited in the present disclosure. For example, when the orientations of the first antenna 1211 and the second antenna 1212 are the same in orientation, that is, the extension line of the orientation of the first antenna 1211 and the extension line of the orientation of the second antenna 1212 are parallel to each other and are in the same direction, the antenna signals radiated by the first antenna 1211 and the second antenna 1212 can be increased by 3 decibels (dB) at most.

Figure 6:
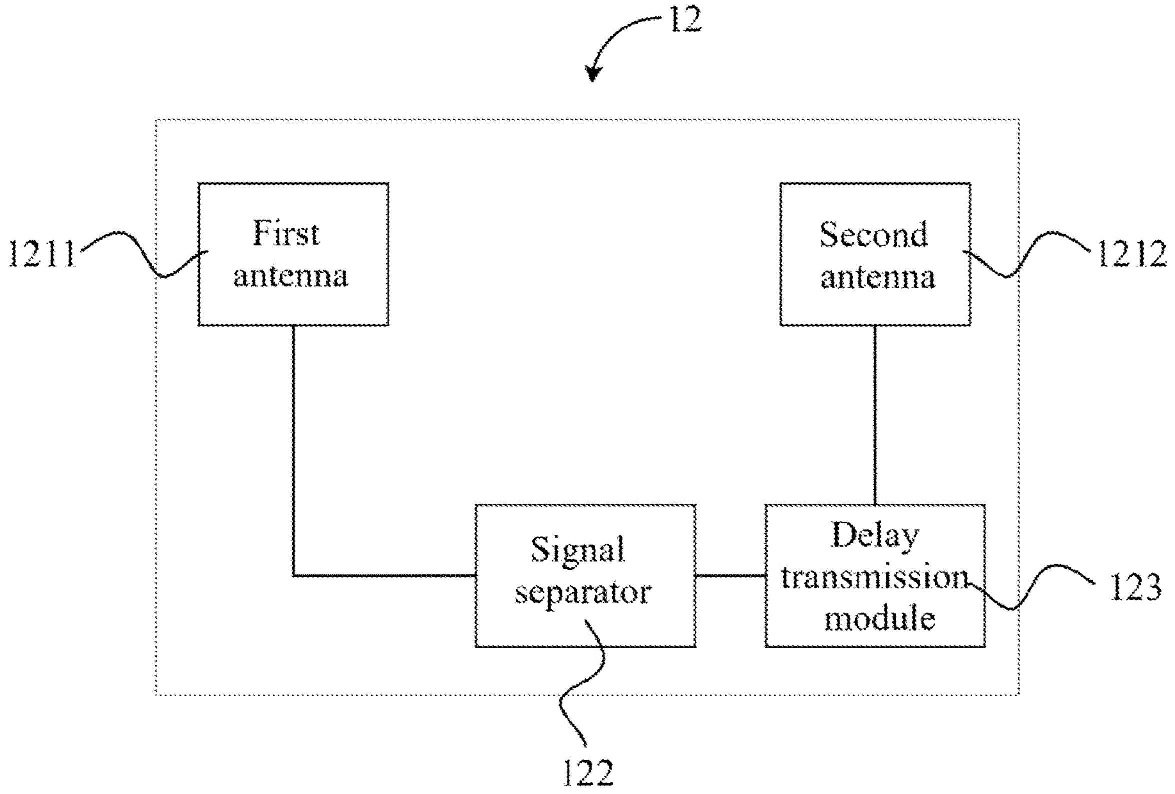
FIG. 6 is a schematic block diagram of a first circuit board according to an embodiment of the present disclosure.

In a possible embodiment, referring to FIG. 6, FIG. 6 is a schematic block diagram of a first circuit board according to an embodiment of the present disclosure. The first circuit board 12 is further provided with a signal separator 122 and a delay transmission module 123. The signal separator 122 is electrically connected to the antenna element 121 and is configured to distribute the excitation signal coupled by the coupler 141 to the antenna element 121; and the delay transmission module 123 is configured to delay a phase of the excitation signal coupled by the coupler 141 and then transmit the signal to the antenna element 121.

Specifically, in this embodiment, in addition to coupling the excitation signals to different antenna elements 121 by the coupler 141, the excitation signals may also be combined or distributed to different antenna elements 121 by the signal separator 122. The signal separator 122 may be, but is not limited to, a microstrip line power divider, a microstrip tapered-line power divider, a Wilkinson power divider, a branch-line coupler or a hybrid ring coupler, etc., which is not limited in the present disclosure.

Specifically, in this embodiment, the delay transmission module 123 is a microstrip transmission line. The so-called microstrip transmission line refers to a microwave transmission line composed of a single conductor strip supported on a dielectric substrate. Since the antenna element 121 and the delay transmission module 123 are located in the same plane, the microstrip transmission line is suitable as a transmission line on a planar structure of a microwave integrated circuit. It can be understood that in other possible embodiments, the delay transmission module 123 may also be other devices, and may be electrically connected to the antenna element 121 to transmit the excitation signal. Of course, the transmission of the excitation signal may also be implemented without the electrical connection to the antenna element 121, which is not limited in the present disclosure.

It can be understood that in this embodiment, by using the signal separator 122 and the delay transmission module 123 in combination, characteristics such as dual polarization and circular polarization of the antenna element 121 are implemented.

In a possible embodiment, the delay transmission module 123 is electrically connected to the second antenna 1212, and the delay transmission module 123 is configured to delay the phase of the excitation signal by 90 degrees.

Specifically, in this embodiment, the extension line of the orientation of the first antenna 1211 is perpendicular to the extension line of the orientation of the second antenna 1212. When the delay transmission module 123 delays the phase of the excitation signal by 90 degrees, that is to say, when there is a phase difference of 90 degrees between the excitation signal received by the second antenna 1212 and the excitation signal received by the first antenna 1211, an antenna structure formed by the first antenna 1211 and the second antenna 1212 has a circular polarization characteristic. The so-called circular polarization refers to a periodic change in an included angle between a polarization plane of the antenna signal and a normal plane of the earth from 0 to 360°. In other words, when the magnitude of an electric field is constant and the direction changes with time, a trajectory of a tail end of an electric field vector is projected as a circle on a plane perpendicular to a direction of propagation.

It can be understood that when the first antenna 1211 and the second antenna 1212 have the circular polarization characteristic, the antenna signals radiated by the first antenna 1211 and the second antenna 1212 can be better received, solving the problem that a receiving object for receiving the antenna signals cannot receive the radiated antenna signals.

Figure 7:
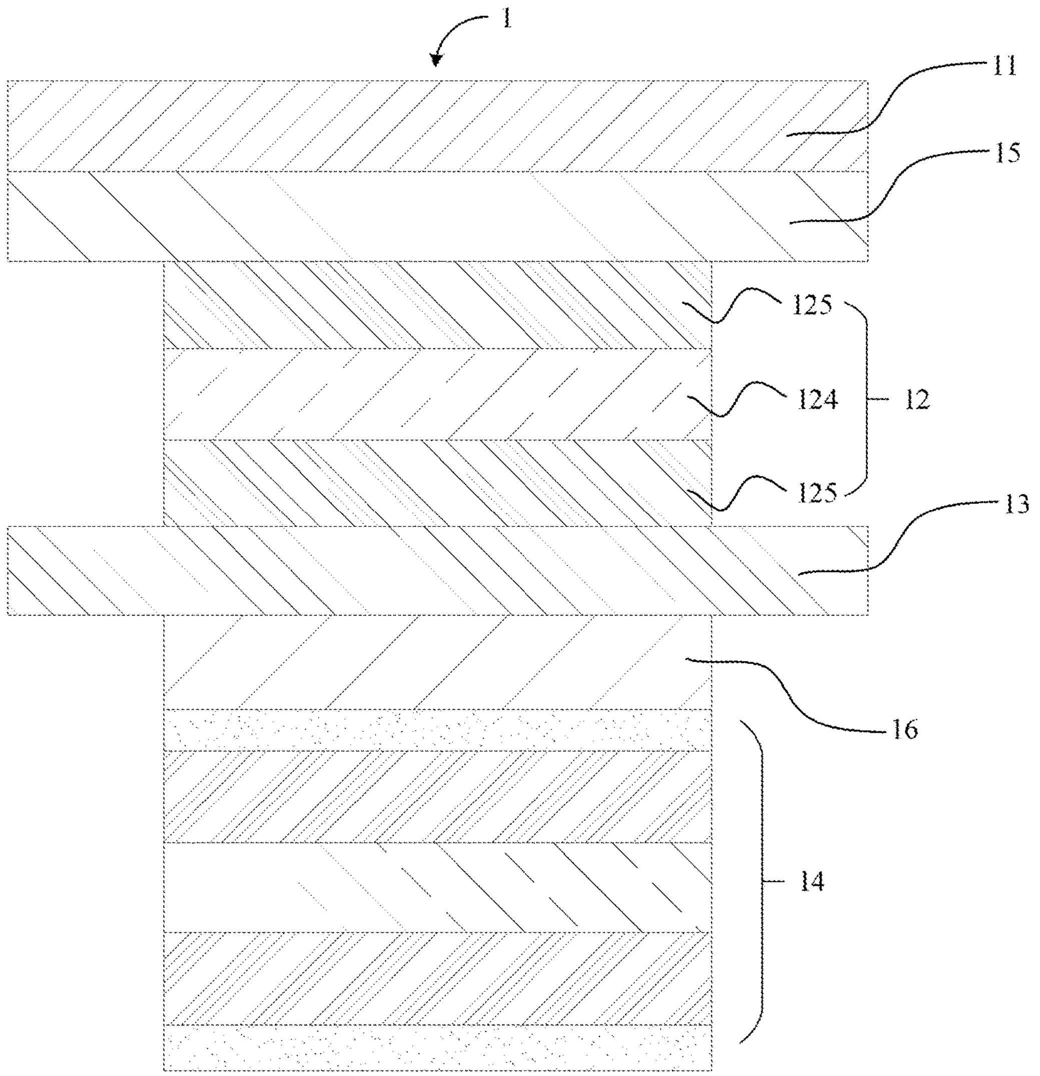
FIG. 7 is a schematic cross-sectional view of a first circuit board according to an embodiment of the present disclosure.
Figure 8:
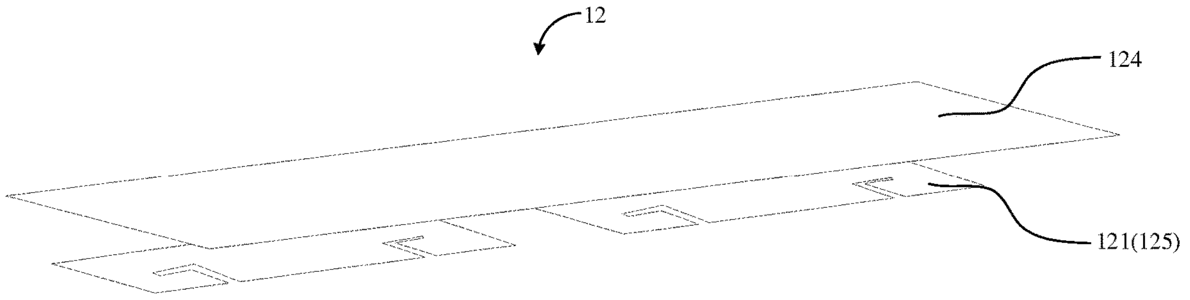
FIG. 8 is a schematic exploded view of a first circuit board according to an embodiment of the present disclosure.

In a possible embodiment, referring to FIG. 7 and FIG. 8 together, FIG. 7 is a schematic cross-sectional view of the first circuit board according to an embodiment of the present disclosure; and FIG. 8 is a schematic exploded view of the first circuit board according to an embodiment of the present disclosure. The first circuit board 12 further includes a first substrate 124 and at least one first conductive layer 125. The at least one first conductive layer 125 is disposed on one side of the first substrate 124. The antenna element 121, the signal separator 122, and the delay transmission module 123 are disposed on the at least one first conductive layer 125. The first substrate 124 is configured to carry the first conductive layer 125.

Specifically, in this embodiment, an example is taken that the number of the first conductive layers 125 is two. The antenna element 121 is disposed on the first conductive layer 125 closer to the second circuit board 14 so as to better receive the excitation signal coupled by the coupler 141. It can be understood that in other possible embodiments, when one first conductive layer 125 is disposed, the first conductive layer 125 is disposed on the side of the first substrate 124 away from the first carrier plate 11.

It can be understood that the signal separator 122 and the delay transmission module 123 are disposed on the first conductive layer 125 and are relatively closer to the antenna element 121, such that the loss of the excitation signal during transmission can be reduced.

Figure 9:
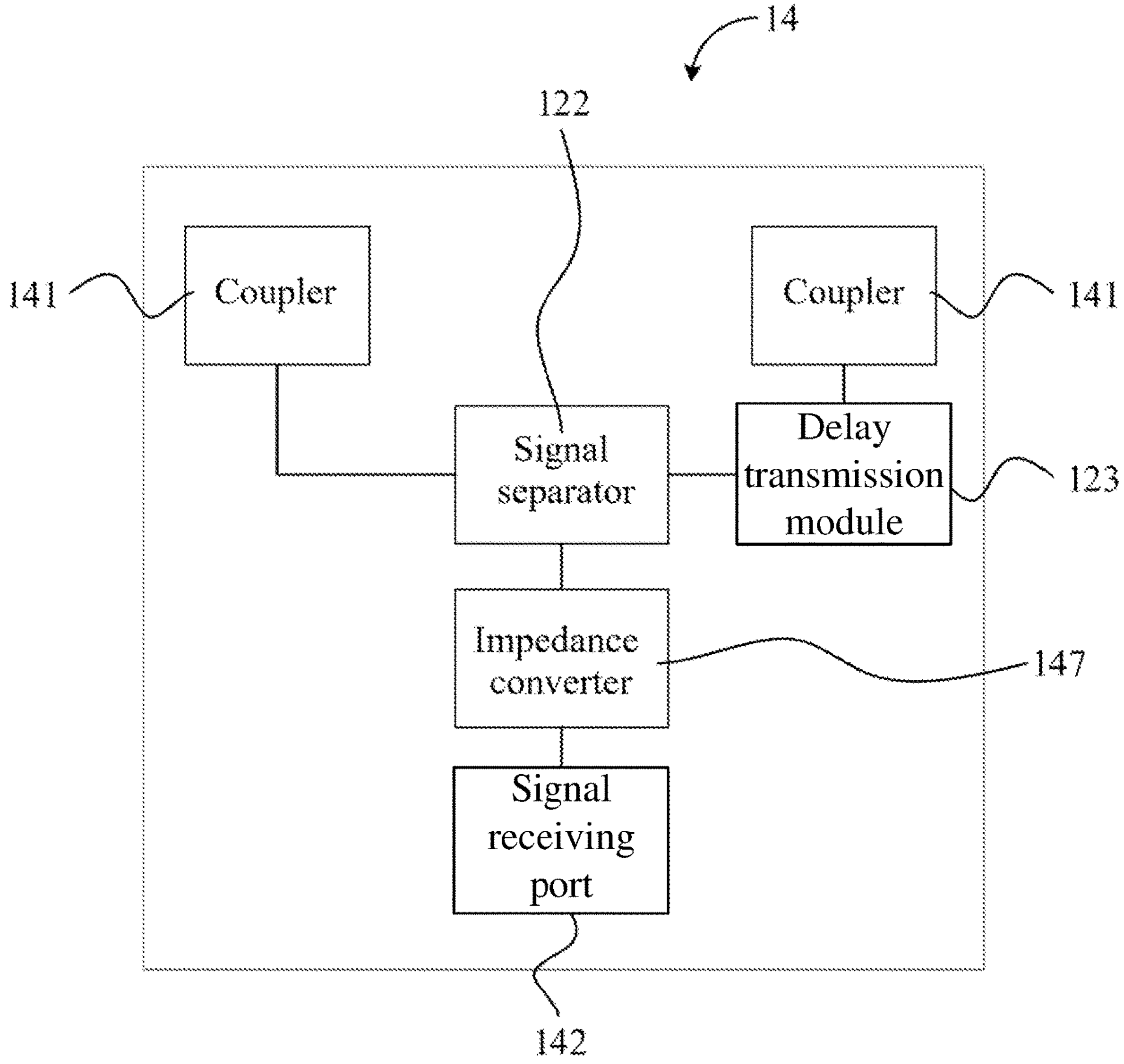
FIG. 9 is a block schematic diagram of a second circuit board according to an embodiment of the present disclosure.

In a possible embodiment, referring to FIG. 9, FIG. 9 is a schematic block diagram of a second circuit board according to an embodiment of the present disclosure. The second circuit board 14 is further provided with a signal receiving port 142, a signal separator 122, and a delay transmission module 123. The signal receiving port 142 is configured to receive an excitation signal externally input. The signal separator 122 is electrically connected to the antenna element 121 and configured to distribute the excitation signal received to the antenna element 121. The delay transmission module 123 is configured to delay a phase of the excitation signal received and transmit the excitation signal delayed to the antenna element 121.

Specifically, the excitation signal received by the signal receiving port 142 may be an antenna signal radiated by an electronic device in the environment, or an excitation signal transmitted by a data line, which is not limited in the present disclosure. The excitation signal received by the signal receiving port 142 is coupled to the antenna element 121 by the coupler 141.

Specifically, the difference between this embodiment and the previous embodiment lies in that the signal separator 122 and the delay transmission module 123 may also be disposed on the second circuit board 14, which is not limited in the present disclosure. For the functions of the signal separator 122 and the delay transmission module 123, please refer to the above description, and details will not be repeated here.

Specifically, in this embodiment, the second circuit board 14 further includes an impedance converter 147, and the impedance converter 147 is electrically connected between the signal receiving port 142 and the signal separator 122. When a load impedance is not equal to a characteristic impedance of the transmission line, or when two segments of transmission lines with different characteristic impedances are connected, reflection occurs in both cases, and the impedance converter 147 converts different impedances to obtain a good match.

In other possible embodiments, the excitation signal received by the signal receiving port 142 may also be led out from a side edge of the second carrier plate 13 by means of a transmission line such as a coplanar waveguide and a microstrip, and accordingly is transmitted to the antenna element 121. Alternatively, the first antenna 1211 and the second antenna 1212 form a multiple-in multiple-out (MIMO) antenna, and receive excitation signals from different signal receiving ports 142 respectively, rather than the signal separator 122. It can be understood that as long as it does not affect the transmission of the excitation signal received by the signal receiving port 142 to the antenna element 121, the present disclosure does not limit a transmission mode of the excitation signal.

Figure 10:
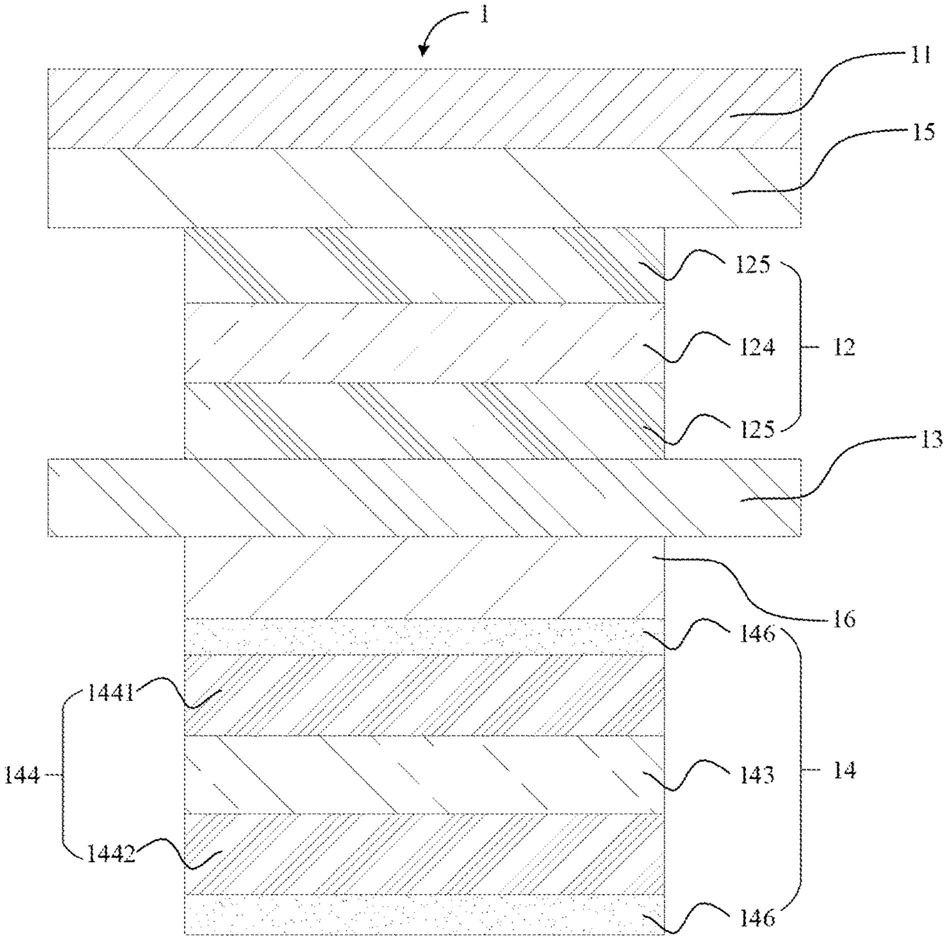
FIG. 10 is a schematic cross-sectional view of a second circuit board according to an embodiment of the present disclosure.
Figure 11:
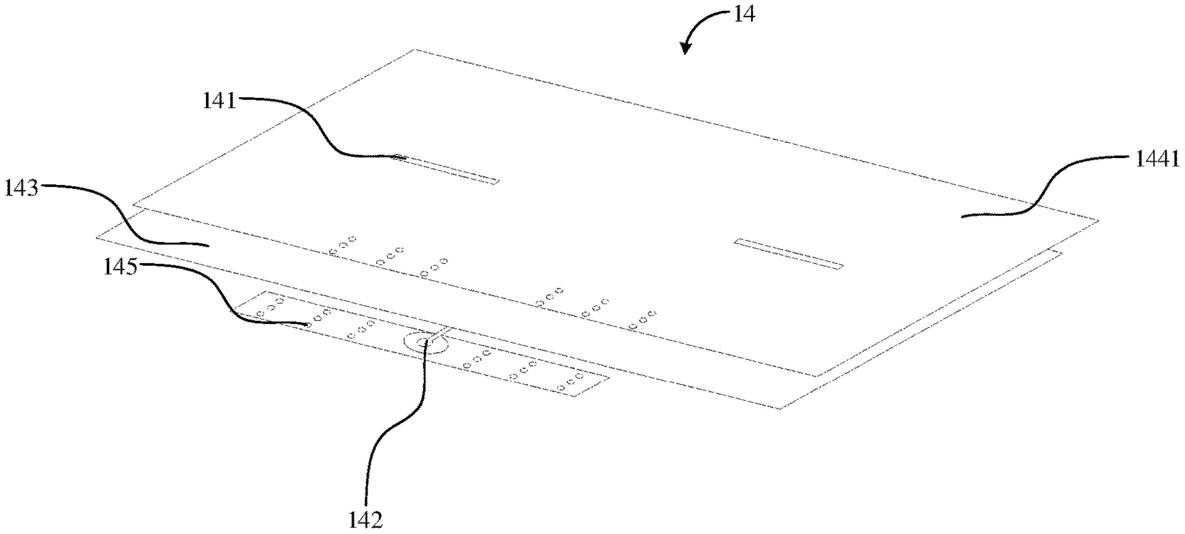
FIG. 11 is a schematic exploded view of a second circuit board according to an embodiment of the present disclosure.
Figure 12:
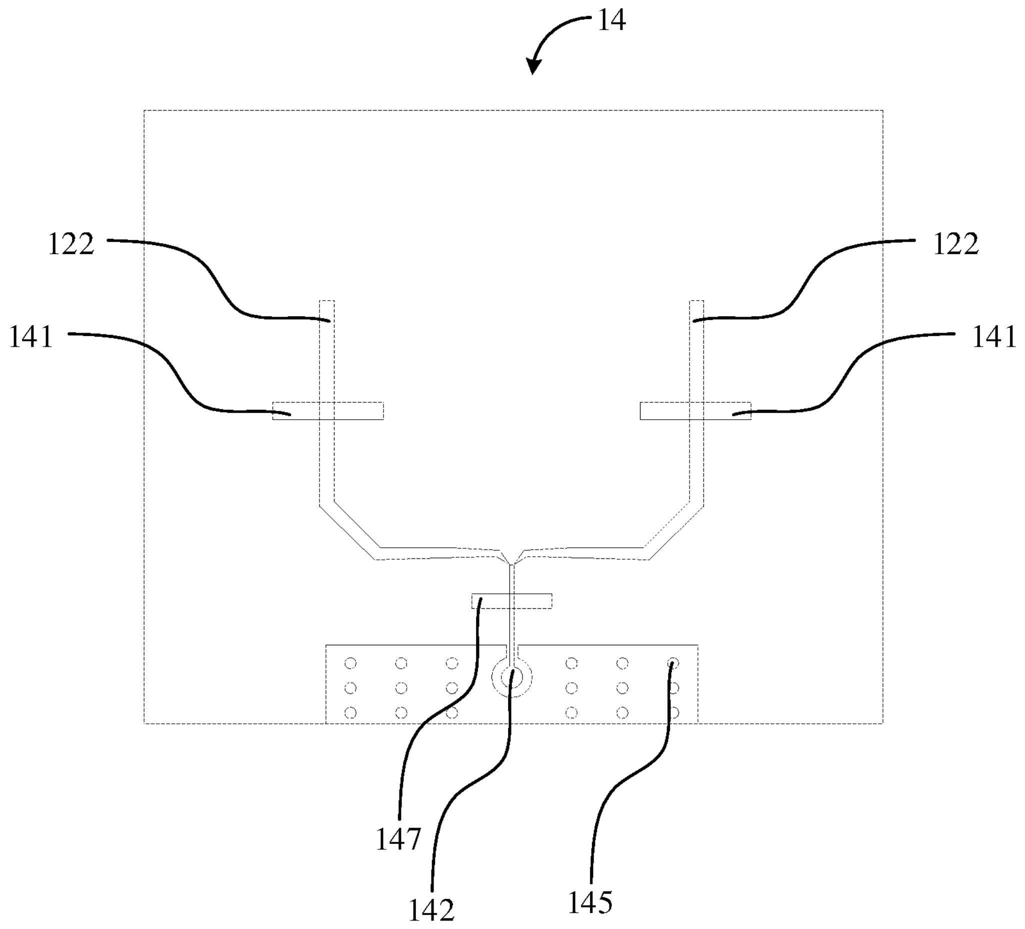
FIG. 12 is a schematic perspective view of a second circuit board according to an embodiment of the present disclosure.

In a possible embodiment, referring to FIG. 10 to FIG. 12 together, FIG. 10 is a schematic cross-sectional view of the second circuit board according to an embodiment of the present disclosure; FIG. 11 is a schematic exploded view of the second circuit board according to an embodiment of the present disclosure; and FIG. 12 is a schematic perspective view of the second circuit board according to an embodiment of the present disclosure. The second circuit board 14 further includes a second substrate 143 and at least one second conductive layer 144. The at least one second conductive layer 144 is disposed on one side of the second substrate 143. The coupler 141, the signal separator 122, the delay transmission module 123, and the signal receiving port 142 are disposed on the at least one second conductive layer 144. The second substrate 143 is configured to carry the second conductive layer 144.

In this embodiment, an example is taken that the number of the second conductive layers 144 is two. When the number of the second conductive layers 144 is two, the two second conductive layers 144 include a first conductive sub-layer 1441 and a second conductive sub-layer 1442, the first conductive sub-layer 1441 and the second conductive sub-layer 1442 are respectively disposed on two sides of the second substrate 143, and the first conductive sub-layer 1441 is disposed close to the second carrier plate 13; the coupler 141 is disposed on the first conductive sub-layer 1441, and the first conductive sub-layer 1441 serves as reference ground of the antenna element 121; and the signal separator 122, the delay transmission module 123, and the signal receiving port 142 are disposed on the second conductive sub-layer 1442.

Specifically, since the first conductive sub-layer 1441 is disposed close to the second carrier plate 13, the coupler 141 is disposed on the first conductive sub-layer 1441, which means that the coupler 141 is closer to the antenna element 121, such that the coupler 141 can couple the excitation signal to the antenna element 121 at a higher efficiency. Furthermore, in this embodiment, the first conductive sub-layer 1441 serves as the reference ground of the antenna element 121, which saves on a circuit design space.

Specifically, in this embodiment, the second circuit board further includes multiple conductive through holes 145, the conductive through holes 145 are defined in the first conductive sub-layer 1441 and the second conductive sub-layer 1442, and the conductive through holes 145 of the first conductive sub-layer 1441 are electrically connected to the conductive through holes 145 of the second conductive sub-layer 1442 by means of a conductive member, so as to achieve the effect of sharing the same reference ground by the first conductive sub-layer 1441 and the second conductive sub-layer 1442.

It can be understood that the signal separator 122 and the delay transmission module 123 may also be disposed on the second conductive sub-layer 1442 of the second circuit board 14, and are electrically connected to the signal receiving port 142 to directly receive the excitation signals externally input, combine or distribute the excitation signals, and couple the excitation signals combined or distributed to the antenna element 121 by the coupler 141.

Specifically, in this embodiment, the second circuit board 14 further includes a protective film 146, and the protective film 146 is arranged between the first conductive sub-layer 1441 and the second carrier plate 13, and on the side of the second conductive sub-layer 1442 away from the second substrate 143 respectively. The protective film 146 plays the roles of preventing oxidation, smog, and falling off on the second conductive layer 144. The protective film 146 may be made of a polyimide (PI) material, and the present disclosure does not limit the material of the protective film 146.

It can be understood that in other possible embodiments, there may also be other numbers of the second conductive layers 144. For example, when one second conductive layer 144 is disposed, the second conductive layer 144 is disposed on the side of the second substrate 143 close to the second carrier plate 13, such that the coupler 141 is closer to the antenna element 121 if the coupler 141 is disposed on the second conductive layer 144. The present disclosure does not limit the number of the second conductive layers 144.

In a possible embodiment, a thickness of the first substrate 124 in a stacked direction ranges from 25 μm to 125 μm; a thickness of the second substrate 143 in the stacked direction ranges from 25 μm to 125 μm; a thickness of the first conductive layer 125 in the stacked direction ranges from 10 μm to 100 μm; and a thickness of the second conductive layer 144 in the stacked direction ranges from 10 μm to 100 μm.

It can be understood that the first substrate 124, the second substrate 143, the first conductive layer 125, and the second conductive layer 144 each are relatively thin in the stacked direction, avoiding that the overall thickness of the antenna assembly 1 is relatively larger, so that the antenna assembly 1 can be mounted on more objects and has a wider application range.

Specifically, in this embodiment, the materials of the first substrate 124 and the second substrate 143 may be, but are not limited to, PI, liquid crystal polymer (LCP), or polyethylene terephthalate (PET), etc., which are not limited in the present disclosure.

It should be noted that the antenna signals that can be received or radiated by the antenna assembly 1 provided in the present disclosure include, but are not limited to, fifth-generation (5G)/fourth-generation (4G) signals, vehicle to everything (V2X), satellite navigation signals (e.g., global navigation satellite system, GNSS), and millimeter-wave radar signals. The GNSS includes a global positioning system (GPS), Galileo, GLONASS, Beidou, Navic, a quasi-zenith satellite system (QZSS), etc.

Figure 13:
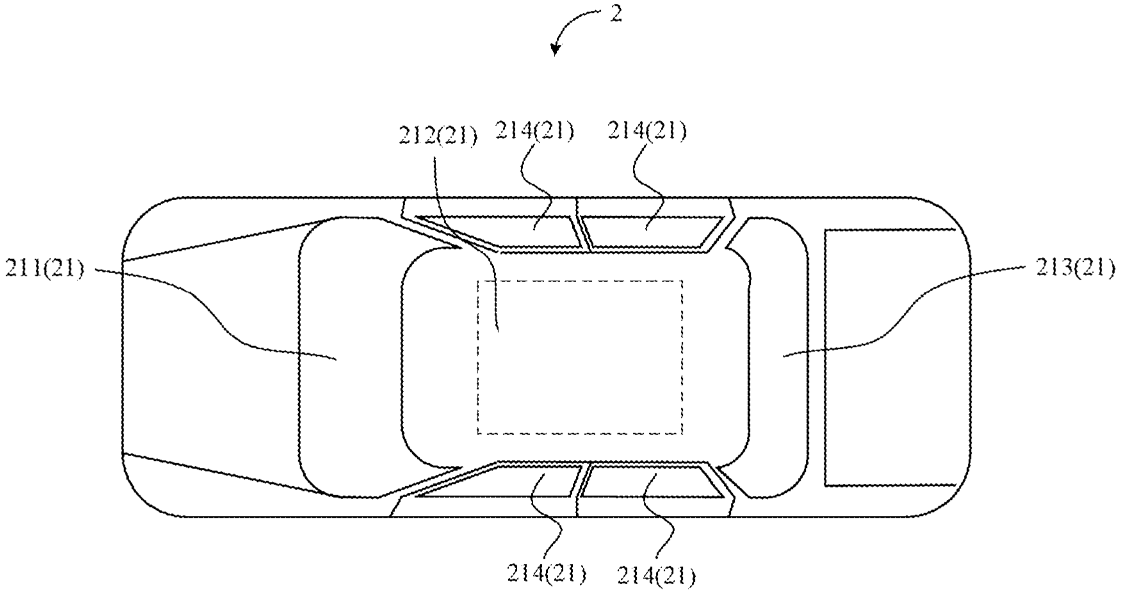
FIG. 13 is a schematic top view of a vehicle according to an embodiment of the present disclosure.

A vehicle 2 is further provided in the present disclosure. With reference to FIG. 13, FIG. 13 is a schematic top view of the vehicle according to an embodiment of the present disclosure. The vehicle 2 includes glass 21 and the above-described antenna assembly 1, and the antenna assembly 1 is disposed on the glass 21.

Specifically, reference may be made to the above description with regard to the antenna assembly 1, which will not be repeated here. It should be noted that in this embodiment, the glass 21 may be, but is not limited to, a windshield 211, a vehicle-mounted sunroof 212, a rear window 213, side window 214, and etc. In the manufacturing process of the windshield 211, the vehicle-mounted sunroof 212, the rear window 213, the side window 214, etc., there may be printed matter on at least one section of an edge of the glass, such as black ink or a colored ribbon. When the first circuit board 12 and the second circuit board 14 are made of a transparent material, such as indium tin oxide (ITO), that is to say, when the light transmittance of the first circuit board 12 and the second circuit board 14 reaches 80%, the first circuit board 12 and the second circuit board 14 may be respectively disposed at other positions of the first carrier plate 11 and the second carrier plate 13, for example, an edge of the front windshield, to avoid misjudgment of a driver due to light reflection and refraction. Moreover, such an arrangement method avoids the positions of electronic devices such as sensors and cameras in the vehicle 2, the isolation of the antenna element 121 can be increased, the effects of diversity reception and multi-path reception can be improved, and a coverage angle of the antenna element 121 can also be increased.

It can be understood that, compared with a traditional antenna arranged outside the vehicle 2, the antenna assembly 1 provided in the present disclosure can protect the first circuit board 12 and the second circuit board 14 therein, thereby preventing the first circuit board 12 and the second circuit board 14 from being damaged. Furthermore, by using the antenna assembly 1 as a carrier, antenna signals that can be received or radiated have a wider range, and since the antenna signals that can be received or radiated are not shielded by a vehicle body of the vehicle 2, signal quality is better.

Although the principle and implementations of the present disclosure are described herein by using specific examples herein, descriptions of embodiments are merely intended to help understand the core idea of the present disclosure. In addition, for those of ordinary skill in the art, changes may be made to the specific implementations and application range based on the idea of the present disclosure. In conclusion, the contents of this specification should not be construed as a limitation to the present disclosure.

What is claimed is:

1. An antenna assembly, comprising:

a first carrier plate;

a first circuit board disposed on one side of the first carrier plate;

a second carrier plate disposed on one side of the first circuit board away from the first carrier plate; and a second circuit board disposed on one side of the second carrier plate away from the first circuit board; wherein the first circuit board comprises at least one antenna element, the second circuit board comprises at least one coupler, the second circuit board is configured to receive or transmit an excitation signal, the excitation signal is coupled to the at least one antenna element by the at least one coupler, and the at least one antenna element is configured to generate an antenna signal according to the excitation signal and radiate the antenna signal;

the first circuit board further comprises a first substrate and at least one first conductive layer disposed on one side of the first substrate, and the at least one antenna element is disposed on one first conductive layer in the at least one first conductive layer close to the second circuit board; and the second circuit board further comprises a second substrate and at least one second conductive layer disposed on one side of the second substrate, and when the at least one second conductive layer is implemented as two second conductive layers, the two second conductive layers comprise a first conductive sub-layer and a second conductive sub-layer, the first conductive sub-layer and the second conductive sub-layer are respectively disposed on two sides of the second substrate, the first conductive sub-layer is disposed close to the second carrier plate, the at least one coupler is disposed on the first conductive sub-layer, and the first conductive sub-layer serves as reference ground of the at least one antenna element.

2. The antenna assembly of claim 1, further comprising:

a first bonding layer disposed between the first carrier plate and the first circuit board and configured to bond the first carrier plate and the first circuit board; and/or a second bonding layer disposed between the second carrier plate and the second circuit board and configured to bond the second carrier plate and the second circuit board.

3. The antenna assembly of claim 1, wherein the at least one antenna element is disposed corresponding to the at least one coupler, and an orthographic projection of the at least one antenna element on the second circuit board covers the at least one coupler.

4. The antenna assembly of claim 1, wherein when the at least one antenna element is implemented as two or more antenna elements, orthographic projections of the two or more antenna elements on the second carrier plate are distributed on two opposite sides of the second carrier plate.

5. The antenna assembly of claim 4, wherein the two or more antenna elements comprise a first antenna and a second antenna, and an extension line of an orientation of the first antenna is perpendicular to or parallel to an extension line of an orientation of the second antenna.

6. The antenna assembly of claim 5, wherein the first circuit board is further provided with:

a signal separator electrically connected to the two or more antenna elements and configured to distribute the excitation signal coupled by the at least one coupler to the two or more antenna elements; and a delay transmission module configured to delay a phase of the excitation signal coupled by the at least one coupler and transmit the excitation signal delayed to the two or more antenna elements.

7. The antenna assembly of claim 6, wherein the delay transmission module is electrically connected to the second antenna, and the delay transmission module is configured to delay the phase of the excitation signal by 90 degrees.

8. The antenna assembly of claim 6, wherein the two or more antenna elements, the signal separator, the delay transmission module are disposed on the at least one first conductive layer, and the first substrate is configured to carry the at least one first conductive layer.

9. The antenna assembly of claim 1, wherein the second circuit board is further provided with:

a signal receiving port configured to receive an excitation signal externally input;

a signal separator electrically connected to the at least one antenna element and configured to distribute the excitation signal received to the at least one antenna element; and a delay transmission module configured to delay a phase of the excitation signal received and transmit the excitation signal delayed to the at least one antenna element.

10. The antenna assembly of claim 9, wherein the at least one coupler, the signal separator, the delay transmission module, and the signal receiving port are disposed on the at least one second conductive layer, and the second substrate is configured to carry the at least one second conductive layer.

11. The antenna assembly of claim 10, wherein the signal separator, the delay transmission module, and the signal receiving port are disposed on the second conductive sub-layer.

12. The antenna assembly of claim 1, wherein the second circuit board further comprises a protective film, and the protective film is arranged between the first conductive sub-layer and the second carrier plate, and on one side of the second conductive sub-layer away from the second substrate.

13. The antenna assembly of claim 1, wherein a thickness of the first substrate in a stacked direction ranges from 25 μm to 125 μm; a thickness of the second substrate in the stacked direction ranges from 25 μm to 125 μm; a thickness of the at least one first conductive layer in the stacked direction ranges from 10 μm to 100 μm; and a thickness of the at least one second conductive layer in the stacked direction ranges from 10 μm to 100 μm.

14. A vehicle, comprising glass and an antenna assembly, wherein the antenna assembly is disposed at the glass, and the antenna assembly comprises:

a first carrier plate;

a first circuit board disposed on one side of the first carrier plate;

a second carrier plate disposed on one side of the first circuit board away from the first carrier plate; and a second circuit board disposed on one side of the second carrier plate away from the first circuit board; wherein the first circuit board comprises at least one antenna element, the second circuit board comprises at least one coupler, the second circuit board is configured to receive or transmit an excitation signal, the excitation signal is coupled to the at least one antenna element by the at least one coupler, and the at least one antenna element is configured to generate an antenna signal according to the excitation signal and radiate the antenna signal;

the first circuit board further comprises a first substrate and at least one first conductive layer disposed on one side of the first substrate, and the at least one antenna element is disposed on one first conductive layer in the at least one first conductive layer close to the second circuit board; and the second circuit board further comprises a second substrate and at least one second conductive layer disposed on one side of the second substrate, and when the at least one second conductive layer is implemented as two second conductive layers, the two second conductive layers comprise a first conductive sub-layer and a second conductive sub-layer, the first conductive sub-layer and the second conductive sub-layer are respectively disposed on two sides of the second substrate, the first conductive sub-layer is disposed close to the second carrier plate, the at least one coupler is disposed on the first conductive sub-layer, and the first conductive sub-layer serves as reference ground of the at least one antenna element.

15. The vehicle of claim 14, wherein the antenna assembly further comprises:

a first bonding layer disposed between the first carrier plate and the first circuit board and configured to bond the first carrier plate and the first circuit board; and/or a second bonding layer disposed between the second carrier plate and the second circuit board and configured to bond the second carrier plate and the second circuit board.

16. The vehicle of claim 14, wherein the at least one antenna element is disposed corresponding to the at least one coupler, and an orthographic projection of the at least one antenna element on the second circuit board covers the at least one coupler.

17. The vehicle of claim 14, wherein when the at least one antenna element is implemented as two or more antenna elements, orthographic projections of the two or more antenna elements on the second carrier plate are distributed on two opposite sides of the second carrier plate.

18. The vehicle of claim 17, wherein the two or more antenna elements comprise a first antenna and a second antenna, and an extension line of an orientation of the first antenna is perpendicular to or parallel to an extension line of an orientation of the second antenna.

* * * * *